US011492947B2

(12) United States Patent
Clark, Jr. et al.

(10) Patent No.: US 11,492,947 B2
(45) Date of Patent: Nov. 8, 2022

(54) PROCESS FOR INCREASING MASS FLOW OF AN EXHAUST GAS THROUGH A CATALYTIC CONVERTER

(71) Applicant: Prototitan, LLC, Albuquerque, NM (US)

(72) Inventors: Chris Clark, Jr., Mooresville, NC (US); David Rochau, Albuquerque, NM (US)

(73) Assignee: Prototitan, LLC, Albuquerque, NM (US)

( * ) Notice: Subject to any disclaimer, the term of this patent is extended or adjusted under 35 U.S.C. 154(b) by 0 days.

(21) Appl. No.: 17/513,699

(22) Filed: Oct. 28, 2021

(65) Prior Publication Data
US 2022/0136425 A1 May 5, 2022

Related U.S. Application Data

(60) Provisional application No. 63/107,355, filed on Oct. 29, 2020.

(51) Int. Cl.
*F01N 3/28* (2006.01)
(52) U.S. Cl.
CPC .................. *F01N 3/2803* (2013.01)

(58) Field of Classification Search
CPC ...... F01N 3/2803; F01N 3/101; F01N 3/2839; F01N 3/2882; F01N 3/2892; F01N 13/08; F01N 2260/06; F01N 2470/20; Y02T 10/12; Y02A 50/20
See application file for complete search history.

(56) References Cited

U.S. PATENT DOCUMENTS

| 10,662,853 | B2* | 5/2020 | Kuramashi | ............... F01N 3/08 |
| 2013/0259760 | A1* | 10/2013 | Kobayashi | .......... F01N 13/0093 |
| | | | | 422/168 |
| 2015/0330279 | A1* | 11/2015 | Melecosky | ........... F01N 3/2066 |
| | | | | 60/299 |

* cited by examiner

*Primary Examiner* — Audrey B. Walter
*Assistant Examiner* — Dapinder Singh
(74) *Attorney, Agent, or Firm* — Edwin A. Sisson, Attorney at Law, LLC; Jeffrey J. Banyas (57) ABSTRACT

Described herein is a process for increasing mass flow of an exhaust gas through a catalytic converter system for a vehicle. The process may comprise determining a centerline and corresponding cumulative centerline bend angle of a first catalytic converter system spanning from an inlet point at a first end of the catalytic converter systems exhaust pipe to an outlet point at a second end of the catalytic converter systems extension pipe. Once determined, the cumulative centerline bend angle may be increased by increasing an individual bend radius of at least one bend within the exhaust pipe and/or within the extension pipe.

20 Claims, 4 Drawing Sheets

PROCESS FOR INCREASING MASS FLOW OF AN EXHAUST GAS THROUGH A CATALYTIC CONVERTER

CROSS REFERENCES AND PRIORITIES

This Application claims priority from U.S. Provisional Application No. 63/107,355 filed on 29 Oct. 2020 the teachings of which are incorporated by reference herein in their entirety.

BACKGROUND

Modern vehicles make ubiquitous use of catalytic converter systems to control the emission of toxic gases and pollutants in exhaust gas from internal combustion engines. Use of catalytic converter systems is required by law in many countries, including the United States as proscribed by regulations from the U.S. Environmental Protection Agency ("EPA") which require gasoline powered vehicles of 1975 model year or newer to be equipped with a catalytic converter system.

The typical catalytic converter system comprises at least three components. The first is a catalytic converter itself. Typically housed withing a canister, the catalytic converter commonly includes a catalyst support or substrate, washcoat—typically of aluminum oxide, titanium dioxide, silicone dioxide, or combinations thereof—used as a catalyst carrier and to increase the surface area of the materials, and a catalyst which catalyzes a redox reaction with exhaust gases from an internal combustion engine. Typical catalysts are often a mixture of precious metals with common examples including platinum, rhodium, cerium, iron, manganese, and nickel.

The second component is an exhaust pipe. The exhaust pipe connects one end of the catalytic converter to the engine's exhaust manifold or exhaust header. This connection may occur through a flange and bolt style connection or a slip-joint style connection.

The third component is an extension pipe. The extension pipe connects the opposite end of the catalytic converter to the vehicle's tailpipe and muffler system. This connection may occur through a flange and bolt style connection or a slip-joint style connection.

Depending upon the type of engine, some catalytic converter systems may require multiple catalytic converters, exhaust pipes, and/or extension pipes. For instance, a vehicle equipped with an in-line four-cylinder engine may require a single catalytic converter connected to a single exhaust manifold or exhaust header by a single exhaust pipe and connected to a single tailpipe and muffler system by a single extension pipe. However, a vehicle equipped with an eight-cylinder engine arranged in a common V-8 configuration may require two catalytic converters with each catalytic converter connected to a separate exhaust manifold or exhaust header by a separate exhaust pipe.

In practice, connecting the catalytic converter to the exhaust manifold or exhaust header, and connecting the catalytic converter to the vehicle's muffler system often requires placing one or more bends in the exhaust pipe and/or extension pipe. These bends constrict the flow of exhaust gases through the catalytic converter system. Such constrictions often result in decreased engine performance due to reduced mass flow of the engine's exhaust gases.

Many attempts have been made to improve engine performance in vehicles equipped with catalytic converter systems. Often, these attempts are hampered by state or federal regulations—such as EPA regulations—which require that the vehicle's catalytic converter be maintained in the same spatial position within the vehicle in order to maintain emissions compliance.

The need exists, therefore, for an improved process for increasing mass flow of exhaust gases through a catalytic converter system of a vehicle.

SUMMARY

A process for increasing mass flow of an exhaust gas through a catalytic converter system for a vehicle is disclosed. The catalytic converter system may comprise at least a first exhaust pipe, a catalytic converter, and a first extension pipe. The first exhaust pipe and/or first extension pipe may comprise at least one bend having a bend radius.

The process may comprise a step of characterizing a first inlet point, a first outlet point, and an end plane of each individual bend of a first catalytic converter system. The process may also comprise a step of determining a first centerline of the first catalytic converter system. The first centerline may be measured from the first inlet point to the first outlet point through a centerpoint of each individual end plane. The first centerline may comprise at least one centerline bend corresponding to a bend of the at least one bend of the first exhaust pipe and or the first extension pipe. Each centerline bend will have a centerline bend angle.

The process may also comprise a step of measure a first baseline cumulative centerline bend angle of the first centerline. The process may further comprise producing a subsequent catalytic converter system having a first increased cumulative centerline bend angle. The first increased cumulative centerline bend angle may be achieved by increasing an individual bend radius of at least one bend within the first exhaust pipe and/or within the first extension pipe. The catalytic converter may be maintained in substantially a same spatial position within the vehicle in both the first catalytic converter system and the subsequent catalytic converter system.

In some embodiments, the catalytic converter system may further comprise a second exhaust pipe. The second exhaust pipe may comprise at least one bend having a bend radius. In such embodiments, the process may comprise as a further step characterizing a second inlet point and an end plane of each individual bend of the first catalytic converter system. The process may also comprise as a further step determining a second centerline of the first catalytic converter system measured from the second inlet point to the first outlet point through a centerpoint of each individual end plane. The second centerline may comprise at least one centerline bend corresponding to a bend of the at least one bend of the second exhaust pipe. As a further step, the process may also comprise measuring a second baseline cumulative centerline bend angle of the second centerline. As a further step, the process may also comprise producing the subsequent catalytic converter system having a second increased cumulative centerline bend angle by increasing an individual bend radius of at least one bend within the second exhaust pipe.

In certain embodiments, the catalytic converter system may further comprise a second extension pipe. The second extension pipe may comprise at least one bend having a bend radius. In such embodiments, the process may comprise the further step of characterizing a second outlet point and an end plane of each individual bend of the first catalytic converter system. The process may also comprise as a further step determining a second centerline of the first catalytic converter system measured from the first inlet point to the second outlet point through a centerpoint of each individual end plain. The second centerline may comprise at least one centerline bend corresponding to a bend of the at least one bend of the second extension pipe. As a further step, the process may also comprise measuring a second baseline cumulative centerline bend angle of the second centerline. As a further step, the process may also comprise producing the subsequent catalytic converter system having a second increased cumulative centerline bend angle by increasing an individual bend radius of at least one bend within the second extension pipe.

In some embodiments, the catalytic converter system may comprise a second exhaust pipe, a second catalytic converter, and a second extension pipe. The second exhaust pipe and/or second extension pipe may comprise at least one bend having a bend radius. In such embodiments, the process may comprise the further step of characterizing a second inlet point, a second outlet point, and an end plane of each individual bend of the first catalytic converter system. The process may also comprise as a further step determining a second centerline of the first catalytic converter system measured from the second inlet point to the second outlet point through a centerpoint of each individual end plane. The second centerline may comprise at least one centerline bend corresponding to a bend of the at least one bend of the second exhaust pipe and/or the second extension pipe. As a further step, the process may comprise measuring a second baseline cumulative centerline bend angle of the second centerline. As a further step, the process may comprise producing the subsequent catalytic converter system having a second increased cumulative centerline bend angle by increasing an individual bend radius of at least one bend within the second exhaust pipe and/or within the second extension pipe.

In certain embodiments the first inlet point may be maintained in substantially a same spatial position within the vehicle in both the first catalytic converter system and the subsequent catalytic converter system. In some embodiments the first outlet point may be maintained in substantially a same spatial position within the vehicle in both the first catalytic converter system and the subsequent catalytic converter system. In certain embodiments, the first inlet point and the second inlet point may both be maintained in substantially a same spatial position within the vehicle in both the first catalytic converter system and the subsequent catalytic converter system. In some embodiments the first outlet point and the second outlet point may both be maintained in substantially a same spatial position within the vehicle in both the first catalytic converter system and the subsequent catalytic converter system.

In some embodiments the process may comprise as a further step increasing an inside diameter of the first exhaust pipe. In certain embodiments the process may comprise as a further step increasing an inside diameter of the first extension pipe. In some embodiments the process may comprise as a further step increasing an inside diameter of the second exhaust pipe. In certain embodiments the process may comprise as a further step increasing an inside diameter of the second extension pipe.

In some embodiments the catalytic converter system may comprise at least one bung hole capable of receiving an oxygen feedback sensor. The at least one bung hole may be maintained in substantially a same spatial position within the vehicle in both the first catalytic converter system and the subsequent catalytic converter system.

DETAILED DESCRIPTION

Disclosed herein is a process for increasing mass flow of a catalytic converter system. The process is described below with reference to the Figures. As described herein and in the claims, the following numbers refer to the following structures as noted in the Figures.

10A depicts a first catalytic converter system.
10B depicts a subsequent catalytic converter system.
20 depicts a first inlet point.
30 depicts a first outlet point.
50A depicts a first centerline.
50B depicts a second centerline
55 depicts a centerline bend.
100 depicts a first exhaust pipe.
110 depicts a first exhaust pipe first end.
120 depicts a first exhaust pipe second end.
130 depicts a flange.
200 depicts a catalytic converter.
210 depicts a catalytic converter inlet.
220 depicts a catalytic converter outlet.
300 depicts an extension pipe.
310 depicts an extension pipe first end.
320 depicts an extension pipe second end.

Figure 1:
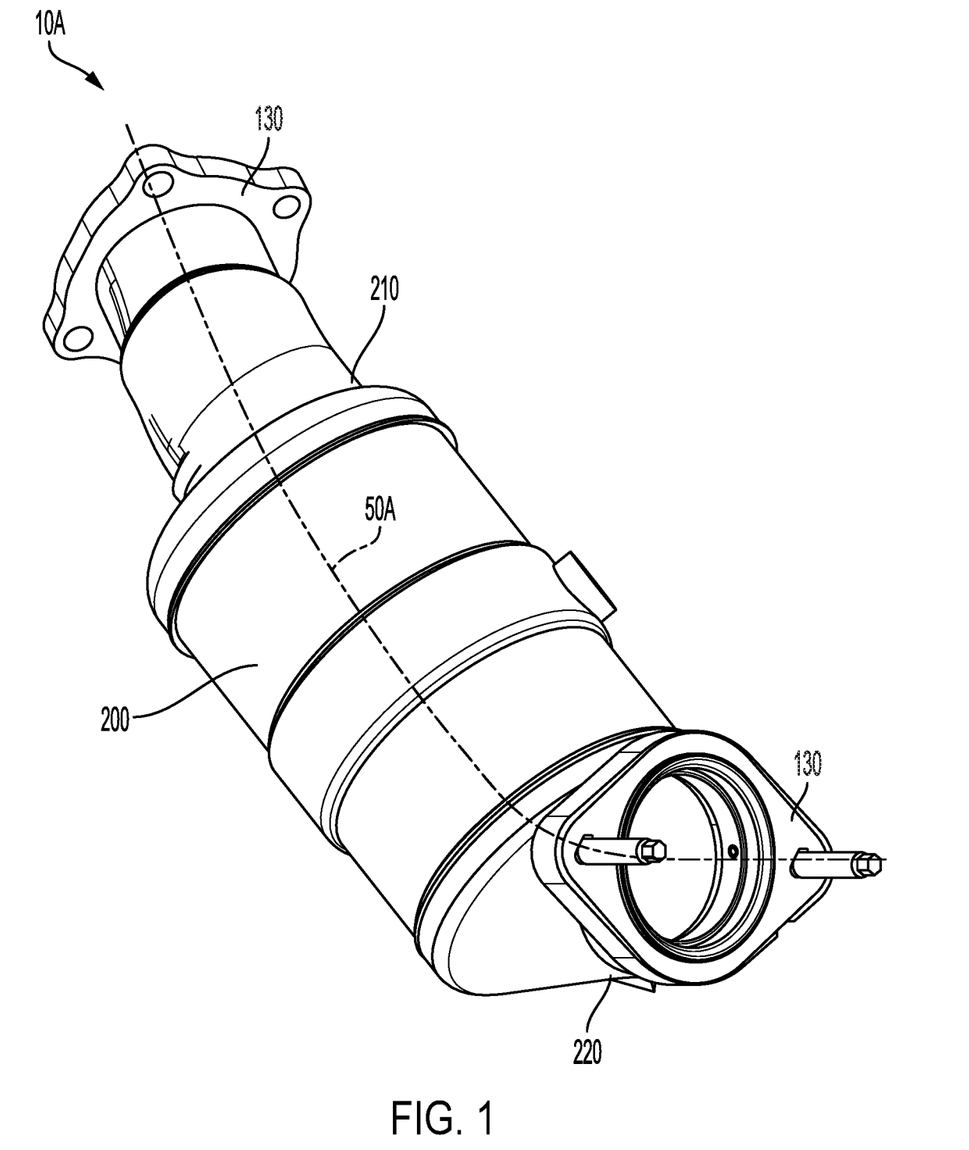
FIG. 1 is a perspective view of one embodiment of a first catalytic converter system for a vehicle.

FIG. 1 depicts a perspective view of an embodiment of a first catalytic converter system (10A). The first catalytic converter system may be an original catalytic converter system—which is a catalytic converter system installed by the OEM manufacturer on the original vehicle—or it may be an earlier installed aftermarket or replacement catalytic converter system. As shown in FIG. 1, the first catalytic converter system may comprise at least one catalytic converter (200) while in some embodiments the first catalytic converter system may comprise two catalytic converters. Each catalytic converter may be connected to the engine's exhaust manifold or exhaust header (not shown) via an exhaust pipe such as the first exhaust pipe (100) shown in FIG. 2. Accordingly, the first catalytic converter system may also comprise at least one exhaust pipe while embodiments comprising two catalytic converters may comprise two exhaust pipes. Each catalytic converter may also be connected to the vehicle's muffler system (not shown) via an extension pipe such as the first extension pipe (300) shown in FIG. 2. Accordingly, the first catalytic converter system may also comprise at least one extension pipe while embodiments comprising two catalytic converters may comprise two extension pipes.

As shown in FIG. 1, each catalytic converter will have a catalytic converter inlet (210) and a catalytic converter outlet (220). Exhaust gases from the vehicle's engine enter at the catalytic converter inlet and flow through the catalytic converter from the catalytic converter inlet through the catalytic converter outlet.

Figure 2:
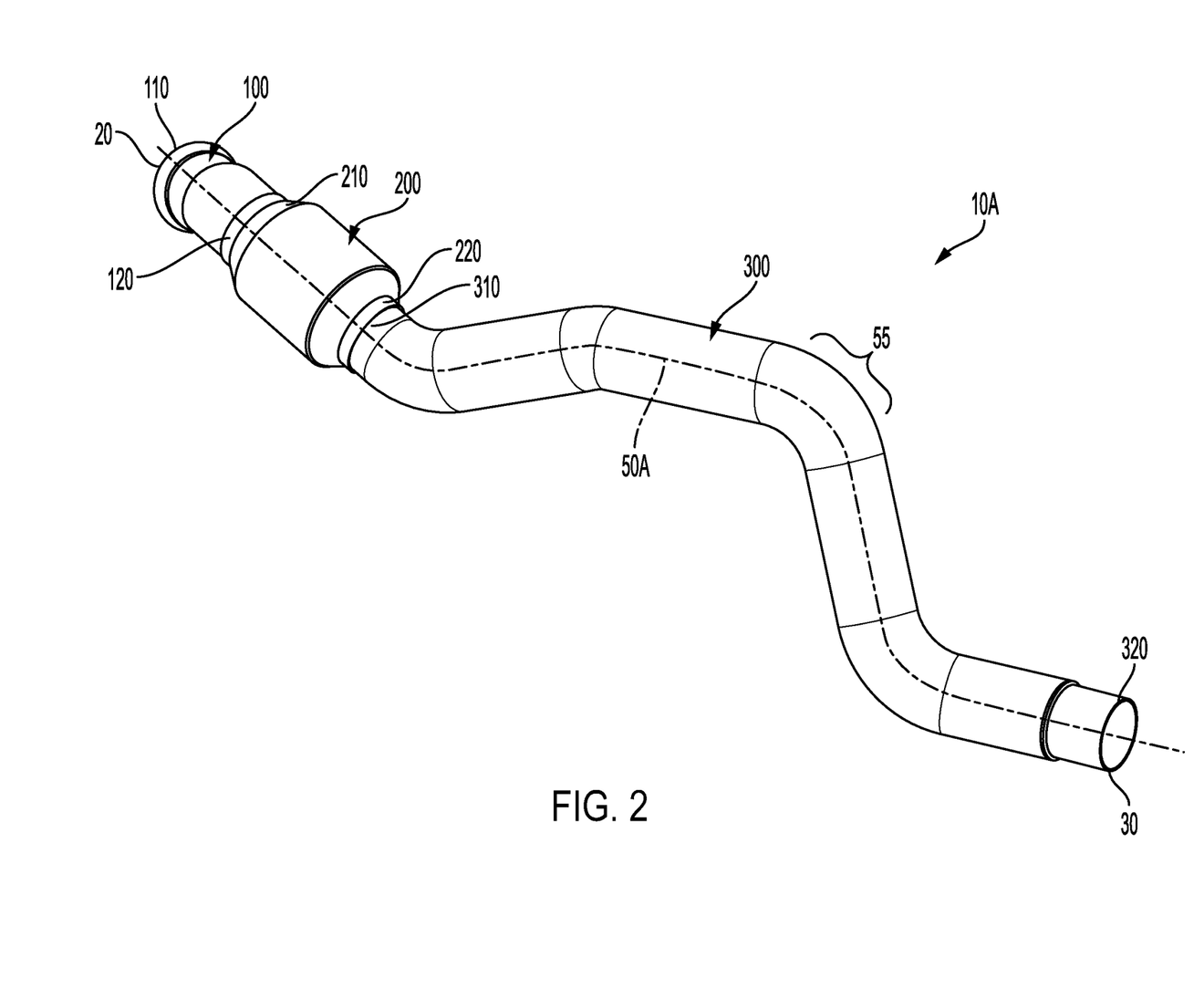
FIG. 2 is a perspective view of one embodiment of a subsequent catalytic converter system for a vehicle with an exhaust pipe and an extension pipe overlaid onto a first catalytic converter system for a vehicle comprising an exhaust pipe and an extension pipe.

FIG. 2 shows that each first exhaust pipe (100) of the first catalytic converter system will have a first exhaust pipe first end (110) and a first exhaust pipe second end (120). When installed in a vehicle, the first exhaust pipe first end will connect to the engine's exhaust manifold or exhaust header (not shown). This connection may occur via a flange which bolts to a corresponding flange (not shown) of the engine's exhaust manifold or exhaust header, or via a slip joint as shown in FIG. 2 in which the exhaust pipe has an inside diameter at the exhaust pipe first end which is slightly greater than an outside diameter of the terminal end (not shown) of the engine's exhaust manifold or exhaust header. This allows the exhaust pipe first end to slip over the terminal end of the engine's exhaust manifold or exhaust header. The exhaust pipe first end may then be further secured to the exhaust manifold or exhaust header by welding and/or via a clamp. Alternatively, the exhaust pipe may have an outside diameter at the exhaust pipe first end which is slightly less than an inside diameter of the terminal end (not shown) of the engine's exhaust manifold or exhaust header. This allows the terminal end of the engine's exhaust manifold or exhaust header to slip over the exhaust pipe first end.

When installed in a vehicle, the first exhaust pipe second end (120) will connect to the catalytic converter inlet (210). This connection may occur via a slip joint as shown in FIG. 2 in which the exhaust pipe has an inside diameter at the exhaust pipe second end which is slightly greater than an outside diameter of the catalytic converter inlet. This allows the exhaust pipe second end to slip over the catalytic converter inlet. Alternatively, the exhaust pipe may have an outside diameter at the exhaust pipe second end which is slightly less than an inside diameter of the catalytic converter inlet. This allows the catalytic converter inlet to slip over the exhaust pipe second end. The exhaust pipe second end may then be further secured to the catalytic converter inlet by welding and/or via a clamp. Alternatively, the connection may occur via a flange at the exhaust pipe second end which bolts to a corresponding flange at the catalytic converter inlet.

Each exhaust pipe may further comprise at least one exhaust pipe bend. In some embodiments, each exhaust pipe may comprise a plurality of exhaust pipe bends. Each exhaust pipe bend will have an exhaust pipe bend radius. The exact exhaust pipe bend radius of any individual exhaust pipe bend will vary based upon a number of factors including the make and model of the vehicle, and the type of engine. The bend radius of an individual exhaust pipe bend may be expressed in terms relative to the diameter of the exhaust pipe (D). In general, the exhaust pipe bend radius measurement of any individual exhaust pipe bend will be in a range selected from the group consisting of between 1×D and 7×D, between 1×D and 5×D, between 1×D and 3×D, between 1.5×D and 7×D, between 1.5×D and 5×D, between 1.5×D and 3×D, between 2×D and 7×D, between 2×D and 5×D, and between 2×D and 3×D.

FIG. 2 further shows that each first extension pipe (300) will have a first extension pipe first end (310) and a first extension pipe second end (320). When installed in a vehicle, the first extension pipe first end will connect to the catalytic converter outlet (220). This connection may occur via a slip joint and clamp as shown in FIG. 2 in which the extension pipe has an inside diameter at the extension pipe first end which is slightly greater than an outside diameter of the catalytic converter outlet. This allows the extension pipe first end to slip over the catalytic converter outlet. Alternatively, the extension pipe may have an outside diameter at the extension pipe first end which is slightly less than an inside diameter of the catalytic converter outlet. This allows the catalytic converter outlet to slip over the extension pipe first end. The extension pipe first end may then be further secured to the catalytic converter outlet by welding and/or via a clamp. Alternatively, this connection may occur via a flange at the extension pipe first end which bolts to a corresponding flange at the catalytic converter outlet.

When installed in a vehicle, the first extension pipe second end (320) will usually connect to the vehicle's tailpipe and muffler system (not shown). This connection may occur via a slip joint in which the extension pipe has an inside diameter at the extension pipe second end which is slightly greater than an outside diameter of the tailpipe or the muffler inlet port (not shown). This allows the extension pipe second end to slip over the tailpipe or the muffler inlet port. Alternatively, the extension pipe may have an outside diameter at the extension pipe second end which is slightly greater than an inside diameter of the tailpipe or the muffler inlet port. This allows the tail pipe or muffler inlet port to slip over the extension pipe second end. The extension pipe second end may then be further secured to the tailpipe or the muffler inlet port by welding and/or via a clamp. Alternatively, the connection may occur via a flange at the extension pipe second end which bolts to a corresponding flange at the tailpipe or muffler inlet port.

Each extension pipe may further comprise at least one extension pipe bend as shown in FIG. 2. In some embodiments, each extension pipe may comprise a plurality of extension pipe bends. Each extension pipe bend will have an extension pipe bend radius. The exact extension pipe bend radius of any individual extension pipe bend will vary based upon a number of factors including the make and model of the vehicle, and the type of engine. In general, the extension pipe bend radius measurement of any individual extension pipe bend will be in the range of between 1×D and 7×D, between 1×D and 5×D, between 1×D and 3×D, between 1.5×D and 7×D, between 1.5×D and 5×D, between 1.5×D and 3×D, between 2×D and 7×D, between 2×D and 5×D, and between 2×D and 3×D.

The first catalytic converter system (10A) will also have a first centerline (50) as shown in FIG. 2. The first centerline will run along the central axis of the exhaust pipe(s), catalytic converter(s), and extension pipe(s) from a first inlet point (20) located at the exhaust pipe first end (110) to a first outlet point (30) located at the extension pipe second end (320). One of ordinary skill will recognize that, in embodiments comprising more than one catalytic converter, more than one exhaust pipe, and/or more than one extension pipe the first catalytic converter system will have multiple first centerlines. For example, when the first catalytic converter system comprises two exhaust pipes with each exhaust pipe connected to one of two catalytic converters, there will be two first centerlines with one of the first centerlines corresponding to the first exhaust pipe and first catalytic converter, and the other first centerline corresponding to the second exhaust pipe and second catalytic converter.

In most embodiments, the first centerline (and optionally the second centerline) will not be a straight line, but will comprise one or more centerline bends (55) with each centerline bend corresponding to an exhaust pipe bend or an extension pipe bend. Each centerline bend of the first centerline (and optionally the second centerline) will have an individual centerline bend angle. The exact angle measurement of any individual centerline bend of the first centerline (and optionally the second centerline) will vary based upon a number of factors including the make and model of the vehicle, and the type of engine. In general, the centerline bend angle measurement of any individual centerline bend of the first centerline (and optionally the second centerline) will be in a range selected from the group consisting of between 90° and 179°, between 90° and 160°, between 90° and 145°, between 90° and 120°, between 120° and 179°, between 120° and 160°, between 120° and 145°, between 145° and 179°, between 145° and 160°, and between 160° and 179°.

Figure 3:
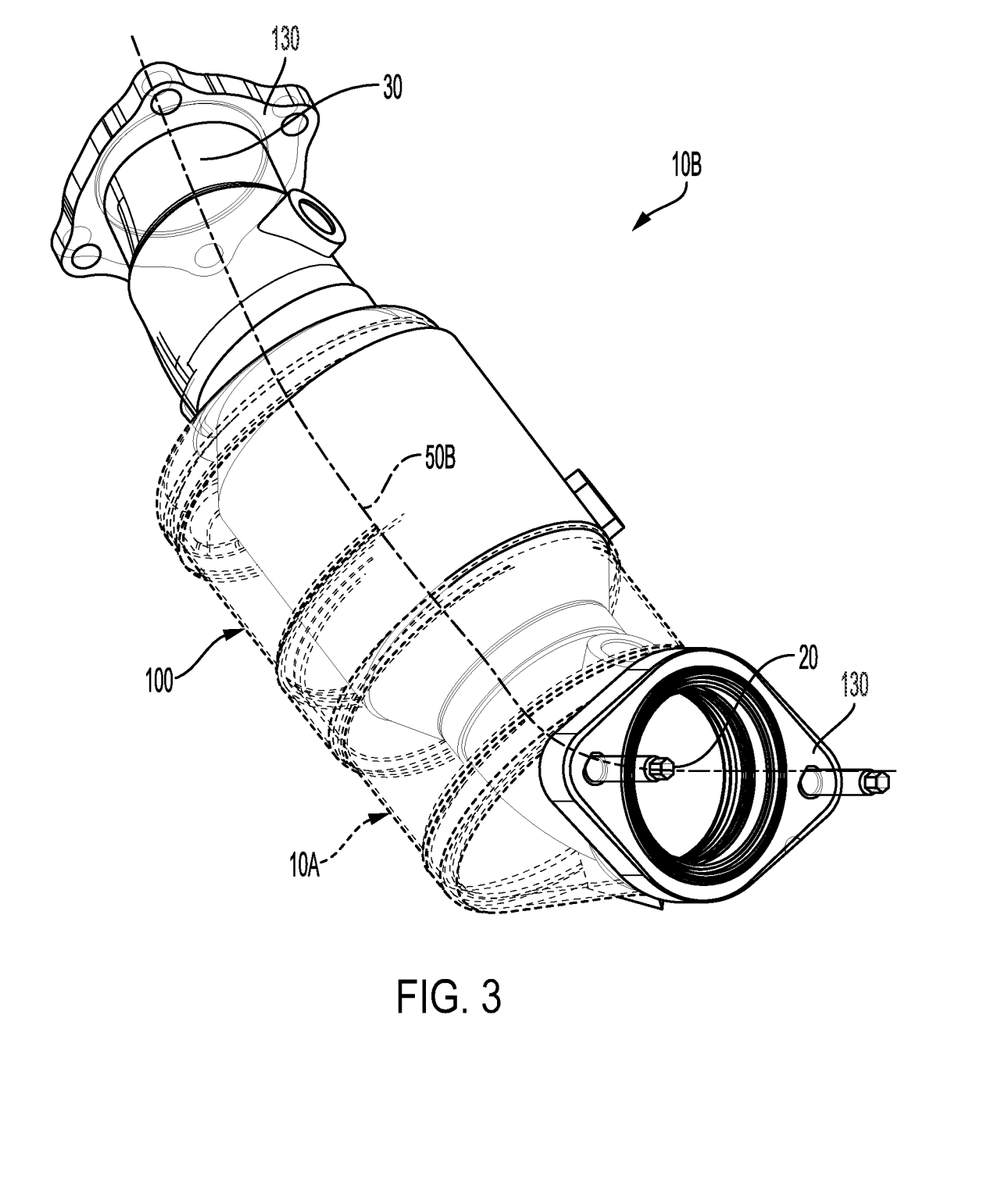
FIG. 3 is a perspective view of one embodiment of a subsequent catalytic converter system for a vehicle overlaid onto a first catalytic converter system for a vehicle.
Figure 4:
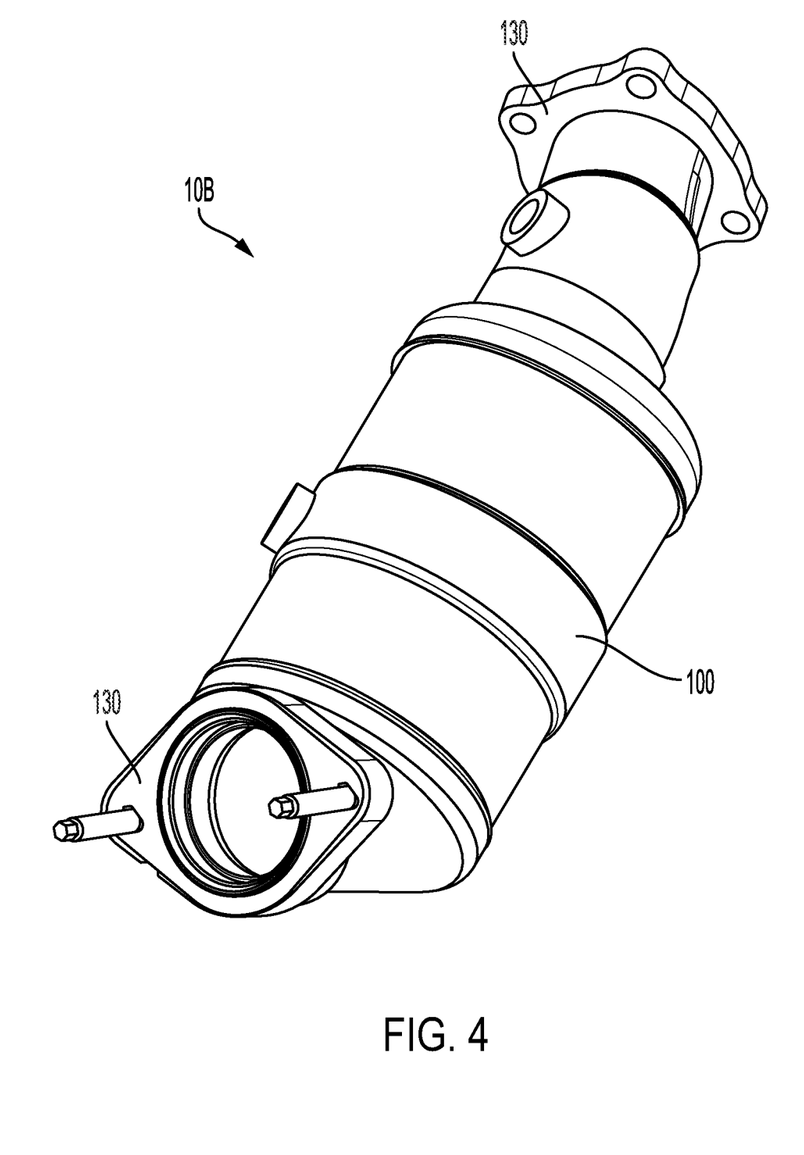
FIG. 4 is a perspective view of one embodiment of a subsequent catalytic converter system for a vehicle.

FIG. 3 shows an example of a subsequent catalytic converter system (10B) made via the process disclosed herein. In general, the process will begin by characterizing a first inlet point (20), a first outlet point (30), and an end plane of each individual bend of the first catalytic converter system (10A as shown in FIG. 1). The first inlet point and first outlet point will correspond to the first exhaust pipe first end (110) and the first extension pipe second end (320) respectively. The end plane will be the plane perpendicular to the length of the pipe at each of the opposing ends of the individual bend.

The first inlet point (20), first outlet point (30), and end planes may be characterized based off of a physical embodiment of the first catalytic converter system (10A). In alternative embodiments, the first inlet point and first outlet point may be characterized using CAD/CAM software based off of a digital three-dimensional model of the first catalytic converter systems. In some embodiments, the digital three-dimensional model may be provided by the factory vehicle manufacturer. In other embodiments, the digital three-dimensional model may be produced by the user prior to characterizing the first inlet point and first outlet point using three-dimensional scanning technology such as a FARO® Quantum FAROARM® & Scanarm Series measuring tool available from FARO Technologies, Inc. of Lake Mary, Fla., U.S.A.

Once the first inlet point, second inlet point, and end planes have been characterized, they may be used to determine the first centerline (50A) of the first catalytic converter system (10A). As described herein, the first centerline will be measured from the first inlet point to the first outlet point with the first centerline intersecting each end plane of each individual bend at the center point of said end planes. As described herein, the first centerline will comprise at least one centerline bend (55) corresponding to a bend of the at least one bend of the first exhaust pipe and/or the first extension pipe with each centerline bend having an individual centerline bend angle. The centerline bend angle measurement of any individual centerline bend of the first centerline will be in the range of between 90° and 179°, between 90° and 160°, between 90° and 145°, between 90° and 120°, between 120° and 179°, between 120° and 160°, between 120° and 145°, between 145° and 179°, between 145° and 160°, and between 160° and 179°.

The first centerline (50A) may be determined based off of a physical embodiment of the first catalytic converter system (10A). Alternatively, the first centerline may be determined using CAD/CAM software based off of a digital three-dimensional model of the first catalytic converter systems obtained as disclosed herein.

Once the first centerline has been determined, the process may involve measuring a first baseline cumulative centerline bend angle of the first centerline (50A). The first baseline cumulative centerline bend angle will be the sum of the centerline bend angle measurement of each individual centerline bend of the first centerline.

After measuring the first baseline cumulative centerline bend angle of the first centerline (50A) of the first catalytic converter system (10A), the cumulative centerline bend angle may be increased to produce the subsequent catalytic converter system (10B). This may be accomplished by increasing an individual bend radius of at least one bend within the first exhaust pipe and/or within the first extension pipe. For instance, the bend radius of one bend in the first exhaust pipe and/or within the first extension pipe in the first catalytic converter system may be 3×D, while in the subsequent catalytic converter system the bend radius of the same bend may be increased to 2×D. The bend radius may be increased by bending the existing exhaust pipe or extension pipe to increase the bend radius, or by fabricating a new exhaust pipe or extension pipe (or section thereof) having an increased bend radius. By increasing the individual bend radius of at least one bend, the cumulative centerline bend angle may be increased such that the first centerline of the subsequent catalytic converter system has a first increased cumulative centerline bend angle.

In embodiments comprising a second exhaust pipe, a second catalytic converter, and/or a second extension pipe, the process may involve increasing the cumulative centerline bend angle of the second centerline. In such embodiments, the process may involve characterizing a second inlet point, a second outlet point, and/or an end plane of each individual bend within the second exhaust pipe and/or the second extension pipe of the first catalytic converter system (10A) with the second inlet point corresponding to the second exhaust pipe first end and the second outlet point corresponding to the second extension pipe second end. The end plane will be the plane perpendicular to the length of the pipe at each of the opposing ends of the individual bend.

In embodiments with a second centerline, after characterizing the second inlet point, the second outlet point, and/or the end planes, the process may involve determining the second centerline. Depending upon the configuration (number of exhaust pipes, number of catalytic converters, and number of extension pipes) the second centerline may be measured from the first inlet point to the second outlet point, from the second inlet point to the first outlet point, or from the second inlet point to the second outlet point. Regardless, the second centerline will intersect each end plane of each individual bend within the second exhaust pipe and/or the second extension pipe at the center point of said end planes.

As described herein, the second centerline will comprise at least one centerline bend (55) corresponding to a bend of the at least one bend of the second exhaust pipe and/or the second extension pipe with each centerline bend having an individual centerline bend angle. The centerline bend angle measurement of any individual centerline bend of the second centerline will be in the range of between 90° and 179°, between 90° and 160°, between 90° and 145°, between 90° and 120°, between 120° and 179°, between 120° and 160°, between 120° and 145°, between 145° and 179°, between 145° and 160°, and between 160° and 179°.

Once the second centerline has been determined, the process may involve measuring a second baseline cumulative centerline bend angle of the second centerline. The second baseline cumulative centerline bend angle will be the sum of the centerline bend angle measurement of each individual centerline bend of the second centerline.

After measuring the second baseline cumulative centerline bend angle of the second centerline of the first catalytic converter system (10A), the cumulative centerline bend angle may be increased to produce the subsequent catalytic converter system (10B). This may be accomplished by increasing an individual bend radius of at least one bend within the second exhaust pipe and/or within the second extension pipe. For instance, the bend radius of one bend in the second exhaust pipe and/or within the second extension pipe in the first catalytic converter system may be 3×D, while in the subsequent catalytic converter system the bend radius of the same bend may be increased to 2×D inches. The bend radius may be increased by bending the existing exhaust pipe or extension pipe to increase the bend radius, or by fabricating a new exhaust pipe or extension pipe (or section thereof) having an increased bend radius. By increasing the individual bend radius of at least one bend, the cumulative centerline bend angle may be increased such that the second centerline of the subsequent catalytic converter system has a second increased cumulative centerline bend angle.

It is believed that increasing the cumulative centerline bend angle(s) by increasing the individual bend radius of at least one bend within the exhaust pipe(s) and/or extension pipe(s) will reduce or eliminate constrictions within the catalytic converter system. Reducing or eliminating these constrictions is believed to increase the mass flow of the engine's exhaust system leading to improved engine performance as indicated by one or more of increased engine horsepower, increased engine torque, and/or audible engine sound.

FIG. 3 shows a perspective view of the subsequent catalytic converter system (10B) overlaid onto the first catalytic converter system (10A). As can be seen in FIG. 3, the centerline(s) of the subsequent catalytic converter system have an increased cumulative centerline bend angle when compared to the cumulative centerline bend angle of the first catalytic converter system.

Throughout the process, it is preferred to maintain the catalytic converter(s) (200) in substantially a same spatial position within the vehicle in both the first catalytic converter system (10A) and the subsequent catalytic converter system (10B) as shown in FIG. 3. More preferably, the catalytic converter(s) are maintained in the exact same spatial position within the vehicle in both the first catalytic converter system and the subsequent catalytic converter system. The spatial position refers to the location of the catalytic converter(s) along an x,y,z axis coordinate system.

In some embodiments, the inlet point(s) (20) are maintained in substantially a same spatial position within the vehicle in both the first catalytic converter system (10A) and the subsequent catalytic converter system (10B) as shown in FIG. 3. Preferably, the inlet point(s) are maintained in the exact same spatial position within the vehicle in both the first catalytic converter system and the subsequent catalytic converter system. The spatial position refers to the location of the inlet point(s) along an x,y,z axis coordinate system.

In some embodiments, the outlet point(s) (30) are maintained in substantially a same spatial position within the vehicle in both the first catalytic converter system (10A) and the subsequent catalytic converter system (10B) as shown in FIG. 3. Preferably, the inlet and outlet point(s) are maintained in the exact same spatial position within the vehicle in both the first catalytic converter system and the subsequent catalytic converter system. The spatial position refers to the location of the inlet and outlet point(s) along an x,y,z axis coordinate system.

In many catalytic converter systems, the first catalytic converter system will comprise one or more oxygen feedback sensors. These oxygen feedback sensors will be attached at a position along the catalytic converter system—often by placing the oxygen feedback sensor into a bung hole which is capable of receiving an oxygen feedback sensor. The process may comprise maintaining the at least one—and preferably all—of the bung hole(s) in substantially the same or exactly the same spatial position within the vehicle in both the first catalytic converter system (10A) and the subsequent catalytic converter system (10B). The spatial position refers to the location of the bung hole(s) along an x,y,z axis coordinate system.

Preferably, both the inlet point(s) (20) and the outlet point(s) (30) are maintained in substantially a same or exactly a same spatial position within the vehicle in both the first catalytic converter system (10A) and the subsequent catalytic converter system (10B) as shown in FIG. 3. The spatial position refers to the location of the inlet point(s) and outlet point(s) along an x,y,z axis coordinate system.

In some embodiments, the mass flow of an exhaust gas may be further increased by increasing an inside diameter of one or more of the exhaust pipe(s) (100) and/or extension pipe(s) (300) during the process. Preferably, the process may comprise increasing an inside diameter of each of the exhaust pipe(s) and extension pipe(s). It is believed that increasing the inside diameter of one or more (or all) of the exhaust pipe(s) and extension pipe(s) will reduce or eliminate constrictions within the catalytic converter system. Eliminating these constrictions is believed to increase the mass flow of the engine's exhaust system leading to improved engine performance as indicated by one or more of increased engine horsepower, increased engine torque, and/or audible engine sound.

What is claimed is:

1. A process for increasing mass flow of an exhaust gas through a catalytic converter system for a vehicle, said catalytic converter system comprising at least a first exhaust pipe (100), a first catalytic converter (200), and a first extension pipe (300); said first exhaust pipe and/or said first extension pipe comprising at least one bend having a bend radius; said process comprising the steps of:
   characterizing a first inlet point (20), a first outlet point (30), and an end plane of each individual bend of a first catalytic converter system (10A);
   determining a first centerline (50A) of the first catalytic converter system measured from the first inlet point to the first outlet point through a centerpoint of each individual end plane, said first centerline comprising at least one centerline bend (55) corresponding to a bend of the at least one bend of the first exhaust pipe and/or the first extension pipe, each centerline bend having a centerline bend angle;
   measuring a first baseline cumulative centerline bend angle of the first centerline; and
   producing a subsequent catalytic converter system (10B) having a first increased cumulative centerline bend angle by increasing an individual bend radius of at least one bend within the first exhaust pipe and/or within the first extension pipe; and
   wherein the catalytic converter is maintained in substantially a same spatial position within the vehicle in both the first catalytic converter system and the subsequent catalytic converter system.

2. The process of claim 1, wherein the catalytic converter system further comprises a second exhaust pipe comprising at least one bend having a bend radius, and wherein the process comprises the further steps of:
   characterizing a second inlet point and an end plane of each individual bend of the first catalytic converter system;
   determining a second centerline of the first catalytic converter system measured from the second inlet point to the first outlet point through a centerpoint of each individual end plane, said second centerline comprising at least one centerline bend corresponding to a bend of the at least one bend of the second exhaust pipe;

measuring a second baseline cumulative centerline bend angle of the second centerline; and producing the subsequent catalytic converter system having a second increased cumulative centerline bend angle by increasing an individual bend radius of at least one bend within the second exhaust pipe.

3. The process of claim 2, wherein the first inlet point and the second inlet point are both maintained in substantially a same spatial position within the vehicle in both the first catalytic converter system and the subsequent catalytic converter system.

4. The process of claim 3, wherein the first outlet point is maintained in substantially a same spatial position within the vehicle in both the first catalytic converter system and the subsequent catalytic converter system.

5. The process of claim 2, wherein the process comprises the further step of:

increasing an inside diameter of the second exhaust pipe.

6. The process of claim 2, wherein the first inlet point is maintained in substantially a same spatial position within the vehicle in both the first catalytic converter system and the subsequent catalytic converter system.

7. The process of claim 1, wherein the catalytic converter system further comprises a second extension pipe comprising at least one bend having a bend radius, and wherein the process comprises the further steps of:

characterizing a second outlet point and an end plane of each individual bend of the first catalytic converter system;

determining a second centerline of the first catalytic converter system measured from the first inlet point to the second outlet point through a centerpoint of each individual end plane, said second centerline comprising at least one centerline bend corresponding to a bend of the at least one bend of the second extension pipe;

measuring a second baseline cumulative centerline bend angle of the second centerline; and producing the subsequent catalytic converter system having a second increased cumulative centerline bend angle by increasing an individual bend radius of at least one bend within the second extension pipe.

8. The process of claim 7, wherein the first inlet point and the second inlet point are both maintained in substantially a same spatial position within the vehicle in both the first catalytic converter system and the subsequent catalytic converter system.

9. The process of claim 8, wherein the first outlet point and the second outlet point are both maintained in substantially a same spatial position within the vehicle in both the first catalytic converter system and the subsequent catalytic converter system.

10. The process of claim 7, wherein the process comprises the further step of:

increasing an inside diameter of the second extension pipe.

11. The process of claim 7, wherein the first inlet point is maintained in substantially a same spatial position within the vehicle in both the first catalytic converter system and the subsequent catalytic converter system.

12. The process of claim 1, wherein the catalytic converter system further comprises a second exhaust pipe, a second catalytic converter, and a second extension pipe; said second exhaust pipe and/or said second extension pipe comprising at least one bend having a bend radius; and wherein the process comprises the further steps of:

characterizing a second inlet point, a second outlet point, and an end plane of each individual bend of the first catalytic converter system;

determining a second centerline of the first catalytic converter system measured from the second inlet point to the second outlet point through a centerpoint of each individual end plane, said second centerline comprising at least one centerline bend corresponding to a bend of the at least one bend of the second exhaust pipe and/or the second extension pipe;

measuring a second baseline cumulative centerline bend angle of the second centerline; and producing the subsequent catalytic converter system having a second increased cumulative centerline bend angle by increasing an individual bend radius of at least one bend within the second exhaust pipe and/or within the second extension pipe.

13. The process of claim 12, wherein the first inlet point and the second inlet point are both maintained in substantially a same spatial position within the vehicle in both the first catalytic converter system and the subsequent catalytic converter system.

14. The process of claim 1, wherein the first inlet point is maintained in substantially a same spatial position within the vehicle in both the first catalytic converter system and the subsequent catalytic converter system.

15. The process of claim 14, wherein the first outlet point is maintained in substantially a same spatial position within the vehicle in both the first catalytic converter system and the subsequent catalytic converter system.

16. The process of claim 15, wherein the first outlet point and the second outlet point are both maintained in substantially a same spatial position within the vehicle in both the first catalytic converter system and the subsequent catalytic converter system.

17. The process of claim 1, wherein the first outlet point is maintained in substantially a same spatial position within the vehicle in both the first catalytic converter system and the subsequent catalytic converter system.

18. The process of claim 1, wherein the process comprises the further step of:

increasing an inside diameter of the first exhaust pipe.

19. The process of claim 1, wherein the process comprises the further steps of:

increasing an inside diameter of the first extension pipe.

20. The process of claim 1, wherein the catalytic converter system comprises at least one bung hole capable of receiving an oxygen feedback sensor, and the at least one bung hole is maintained in substantially a same spatial position within the vehicle in both the first catalytic converter system and the subsequent catalytic converter system.

* * * * *